Patented Aug. 27, 1935

2,012,727

UNITED STATES PATENT OFFICE 2,012,727

RUBBER COMPOSITION AND PROCESS OF PRODUCING THE SAME

Edward Arthur Murphy, Erdington, and Douglas Frank Twiss, Wylde Green, England, assignors to Dunlop Rubber Company, Limited, a British corporation No Drawing. Application February 11, 1932, Serial No. 592,437. In Great Britain February 20, 1931

12 Claims. (Cl. 106—23)

This invention comprises improvements in or relating to the manufacture of rubber compositions, and is particularly concerned with the production from aqueous dispersions of rubber and like material, of dispersions of granular precipitates capable of being consolidated by filtration into material of continuous uniform texture.

The invention of this application is an improvement on application Serial No. 466,612 filed July 8, 1930, the improvement lying in having a large amount of water present during precipitation whereby a fine, granular or flocculent precipitate that can easily be filtered is obtained.

According to the invention the aforesaid dispersions of granular precipitates are produced by a process which comprises effecting the coagulation of the aqueous dispersions hereinafter specified by precipitating in situ in the presence of a relatively large quantity of water one or more compounding ingredients of a nature hereinafter described, by the interaction or double decomposition of one or more water soluble reagents having normally no coagulating effects upon the aforesaid dispersions with one or more water soluble reagents an ion or ions of which may incidentally possess coagulating influence subsequently added thereto, whereupon the aforesaid dispersions are transformed into dispersions of granular precipitates.

It is to be understood that the presence of the relatively large quantity of water is of extreme importance in controlling the size of the precipitate produced. Although the precipitate obtained is sufficiently coarse to allow filtration a coherent mass is obtained on filtration substantially indistinguishable from that resulting from an ordinary latex film.

If desired these dispersions of granular precipitates can be consolidated by filtration over a filtering surface preferably of suitable form through which passes the major portion of the water content.

Furthermore these dispersions of granular precipitates if desired need only be partially concentrated by filtration to form a paste which may be stored and subsequently rediluted for use.

Examples of the water soluble reagents of the first class having normally no coagulating effects upon the dispersions are—carbonates, sulphates, silicates of the alkali metals or of ammonium.

Examples of the water soluble reagents of the second class which interact with the water-soluble reagents of the first class to produce insoluble compounding ingredients are soluble salts of magnesium, aluminium, calcium, barium or zinc; sodium silicate also falls into this class if the corresponding reagent in the first class is such as to precipitate silicic acid—e. g. ammonium carbonates.

By a suitable choice of the reagents and consequent reaction products dispersions of varying consistency can be formed.

If desired the granular precipitates can be washed free from soluble reaction products such as soluble sulphates or chlorides by known means such as filtration and washing prior to their consolidation or concentration.

Numerous substances are capable of being used as compounding ingredients, for example, carbonates of magnesium calcium and zinc may be prepared from sodium carbonate and sulphates or chlorides of these metals. Similarly the silicates of magnesium and zinc can be prepared from sodium silicate and the corresponding sulphate or chloride.

Mixtures of precipitates may be prepared and the reactions may be chosen in such a manner that only one soluble reaction product results for two insoluble products, for example, the reaction between one equivalent of sodium carbonate and one of magnesium sulphate followed by one equivalent of barium chloride yields only one equivalent of sodium chloride for two equivalents of mixed precipitate. In this manner a larger yield of precipitate may be obtained relative to the amount of soluble salt formed.

The reagents may be added in the form of their aqueous solutions and may contain protective colloids such as glue, gum acacia, in solution to increase the fineness of subdivision of the precipitated compounding ingredients.

The rate at which coagulation takes place after the introduction of the water soluble reagents of the second class may be controlled by the addition of suitable substances, for example, casein.

The emulsions or dispersions of rubber or the like comprise those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired any of the aforementioned dispersions may be used alone or in admixture with one another. Any of the aforesaid dispersions may contain the usual known compounding and vulcanizing ingredients and/or may be in concentrated form.

Concentrates such as are obtained in U. S.

Patent 1,846,164, or in British Patent No. 219,635 to which may be added any one or more of the usual compounding ingredients may also be used.

The aforesaid vulcanizing and other compounding ingredients which are added in the form of their dispersions may be added to the aforesaid aqueous emulsions or dispersions of rubber or the like prior or subsequent to the precipitation of the granular dispersions.

It is preferable to add the aforesaid dispersions of the vulcanizing and other compounding ingredients before the precipitation of the granular dispersions.

In some cases where the precipitate obtained is found to be in a damp powdery or short paste-like condition before consolidation into the compact uniform mass, consolidation can be hastened and facilitated by treating the filter cake obtained with a rubber solvent which may be mixed with a mutual solvent for the water and the rubber solvent employed, as for instance alcohol.

It is possible according to the present invention to produce products having mechanical properties ranging from those of soft rubber to vulcanite by the suitable selection and adjustment of the proportions of the insoluble reaction products. In certain cases it has been found that vulcanizing is unnecessary.

The homogeneous granular precipitates obtained according to this invention are suitable for the manufacture of a large variety of articles such as boot soles, sheet flooring and treads for tires.

Colloidal magnesium silicate may similarly be formed by substituting magnesium sulphate for the aluminum sulphate in the above process.

The following is given by way of example as to how to produce compact homogeneous rubber sheet from the aforesaid granular precipitates.

A latex having the following composition:—

| | Parts by weight |
|---|---|
| Rubber used in the form of latex at 60% concentration | 75 |
| Colloidal aluminum silicate | 25 |
| Casein | 0.75 | is prepared in the following manner:—

Six parts by weight of casein are added in the form of 5% aqueous ammoniacal solution to 100 parts of concentrated latex of 60% concentration produced by centrifugalization. 26 parts of sodium silicate in the form of 5% solution are stirred into the latex and this is followed by the addition of 24 parts of aluminium sulphate also in the form of 5% solution. The total solid content is now approximately 10%. A slurry like precipitate is obtained which is placed on a filter base of the desired dimensions and subjected to filtration which may be aided by external pressure and suction. After the filter cake has been consolidated to a compact sheet it is placed in a warm air chamber to remove residual moisture.

What we claim is:

1. A process for the manufacture of compounded homogeneous compositions of rubber which comprises adding to an aqueous dispersion of rubber material a water soluble reagent having normally no coagulative effect upon said dispersion and then adding a reagent to form a water insoluble inert inorganic compounding ingredient by an interaction with said first reagent and having ions which possess coagulating influence upon said dispersion sufficient to coagulate said dispersion, the quantity of water in said resulting mixture being such that the total solids do not exceed ten per cent of said dispersion, then filtering the resulting crumb-like coagulate to a compact coherent mass.

2. A process as claimed in claim 1 wherein the water soluble reagents of the first class added, having normally no coagulating effect upon the aforesaid dispersions are salts of the group consisting of alkali metals or of ammonium.

3. A process as claimed in claim 1 wherein the water soluble reagents of the second class added to produce insoluble compounding ingredients are the soluble salts of the group consisting of magnesium, aluminium, calcium, barium or zinc.

4. A process as claimed in claim 1 wherein sodium silicate is added to the aqueous dispersions aforesaid containing as the reagent in the first class a reagent such as to precipitate silicic acid.

5. A process as claimed in claim 1 wherein the crumb-like precipitates are consolidated by filtration.

6. A process as claimed in claim 1 wherein the dispersions of crumb-like precipitates are partially concentrated to a paste by filtration.

7. A process as claimed in claim 1 wherein the crumb-like precipitates are washed free from soluble reaction products.

8. A process as claimed in claim 1 wherein the compounding ingredients produced in situ are the carbonates of the group consisting of magnesium, calcium and zinc.

9. A process as claimed in claim 1 wherein the compounding ingredients produced in situ are the silicates of magnesium and zinc.

10. A process as claimed in claim 1 wherein mixtures of precipitates are prepared in such a manner that only one soluble reaction product results from two insoluble products.

11. A process as claimed in claim 1 wherein the reaction between one equivalent of sodium carbonate with one equivalent of magnesium sulphate is followed by one equivalent of barium chloride resulting thereby in the yield of one equivalent of sodium chloride for two equivalents of mixed precipitate.

12. A process as claimed in claim 1 wherein the reagents are added in the presence of protective colloids.

EDWARD ARTHUR MURPHY.
DOUGLAS FRANK TWISS.